Patented May 28, 1946

2,400,904

UNITED STATES PATENT OFFICE 2,400,904

CHEMICAL PROCESS

George W. Batchelder, Mantua, and Wesley M. Nagle, John C. Vyverberg, and James M. Willis, Woodbury, N. J., assignors to E. I. du Pont de Nemours & Company, Wilmington, Del., a corporation of Delaware No Drawing. Application January 22, 1944, Serial No. 519,350

9 Claims. (Cl. 260—645)

This invention relates to an improved process for the preparation of a mononitrocompound low in content of higher nitration products and oxidation by-products, and more particularly to a process for the preparation of mononitroxylene.

When the mononitration of xylene is carried out by means of nitric acid, very careful control of conditions and proportions is required. The usual procedure is to employ a nitrating acid comprising a mixture of sulfuric and nitric acids. If nitric acid is present in an amount greater than that required to combine with all of the xylene to form the mononitrocompound, an undesirably high content of dinitroxylene results. If a decreased amount of nitric acid is used, considerable unnitrated xylene remains, with consequent loss in efficiency and yield. Even with a deficiency of nitric acid, formation of dinitroxylene may occur because of localized concentrations within the nitration mixture. This dinitroxylene content is of little consequence when the mononitrocompound is the first step in the preparation of the dinitro or trinitrocompound. In certain cases, however, where xylidine is to be prepared from the nitroxylene, a low content of dinitroxylene is highly important. The prior art methods have not shown how to prepare such a product of satisfactory properties.

An object of the present invention is an improved method for the preparation of mononitroxylene low in dinitroxylene content and by-product impurities. A further object is such a method where exceptional contact of xylene and nitrating agent is attained throughout the nitration, whereby localized excesses of acid are avoided. A further object is a method in which improved separation efficiency between nitrocompound and residual acid is obtained. A still further object is a mononitroxylene product of superior and improved properties. Additional objects will be disclosed as the invention is described more at length in the following.

We have found that the foregoing objects are accomplished, and the disadvantages of the prior art overcome, when we carry out the nitration of xylene with mixed acid, while maintaining sufficiently vigorous agitation that substantial emulsification exists throughout the mixture, acid compositions and ratios being so controlled that the required amount of nitric acid is present to combine with the xylene to form the mononitrocompound, and the agitation being such that extremely intimate contact of acid and xylene is maintained. At the same time, the acid feed rate is so maintained that a satisfactory amount of acid is continually present at the face of contact with the xylenes.

The following example will illustrate the method of carrying out the invention by showing the specific procedure, compositions, ratios, and conditions employed. It will be understood that this is by way of illustration only and is not to be taken as limiting our invention in any way.

Example

Xylene was introduced into the nitrator in the amount of 2600 lbs. and was brought to a temperature of 110° F. The agitator, consisting of a three-blade propeller, 3 ft. in diameter, was started and was caused to revolve at a rate of 140 R. P. M. A mixed acid was used of the following composition: 63.5% $H_2SO_4$, 19.0% $HNO_3$, 17.5% $H_2O$. This was added in the amount of 8900 lbs. over a period of 30 minutes and a constant temperature of 110° F. was maintained, with cooling water circulating through the coils. The agitation was sufficiently vigorous that a state of substantial emulsification existed throughout the mixture. After addition of all the acid, vigorous agitation was continued for 5 minutes, with the temperature still maintained at 110° F. A 50-50 mixture of sodium fluoride and kieselguhr, in the amount of 100 g., was then added to the charge. Agitation was continued for 30 seconds and then stopped, and the contents of the nitrator were allowed to settle. A sharp separation resulted and the spent acid was drawn from the bottom of the nitrator and run to storage tanks. The mononitroxylene was likewise caused to flow into storage tanks prior to neutralization.

Sixty-five hundred pounds of the nitroxylene, equivalent to two nitrator charges, was run into a stainless steel tank and was agitated with 2500 lbs. of hot water, after which separation took place and the acid water was drawn off. A neutralizing wash was then given in the same manner, except that 100 lbs. of sodium carbonate had been added to the water. Two additional hot water washes were given the nitroxylene, and the latter was separated from the water. Air was then blown through the neutralized nitroxylene at a temperature of 130° F. for about 30 minutes. The resulting product was clear and translucent in appearance.

In carrying out a nitration according to our invention, we use a nitrating acid comprising a mixture of sulfuric and nitric acids with a nitric content between 15% and 40%, and preferably between 18.0% and 20.0% $HNO_3$. Desirably a ratio between 0.6 and 0.7 part by weight of nitric acid to one part of xylene is used. Increasing this ratio gives an increased dinitroxylene content in the nitrated product, while a decrease gives little advantage from the viewpoint of dinitro formation and increases the content of unnitrated material. We find it desirable to use a nitrating acid having a DVS between 2.60 and 2.95, DVS being a well-known designation for the dehydrating value of sulfuric acid which is obtained by dividing the percentage of sulfuric acid in the original mixed acid by the percentage of water in the spent acid. The DVS of the acid used in the example is approximately 2.77.

An essential feature of the invention is the very vigorous agitation during nitration, whereby mononitration is effected without the necessity of using an excessive amount of nitric acid and oxidation by-products are kept to a minimum. With such agitation, all localized excesses of acid are prevented, together with properly balanced feed rates which are determined by trial for each size and design of nitrator, so that nitration is almost exclusively to the mono stage, with very little formation of dinitroxylene. On the other hand, deficiencies of nitric acid are avoided, which have been found to increase the formation of oxidation by-products.

We state in the example, and in subsequent claims, that the agitation is sufficiently vigorous that substantial emulsification of acid and nitrocompound exists throughout the mixture. In appearance, therefore, the mixture looks cloudy or milky rather than clear and translucent. By the term "substantial emulsification" we intend to designate such a degree that separation of the layers of acid and nitrocompound, so that a sharp line exists between them, does not take place without settling for more than 10 minutes, when no separation accelerator is added. This will refer to the conditions in a nitrator approximately 5 ft. in depth and 6 ft. inside diameter.

While the vigorous agitation and consequent emulsification of the nitrator contents is advantageous from the viewpoint of controlled degree of nitration, the resulting relatively long settling period is a disadvantage, since it is time-consuming and greatly reduces the output of a given equipment. We find that we can obtain the advantage of complete and controlled nitration, while avoiding long separation times, by adding to the charge at the end of the nitration a separation adjuvant; for example, a soluble fluoride and a silicious material. We find sodium fluoride and kieselguhr in substantially equal amounts to function very effectively for this purpose and may use total amounts of the two ingredients between 0.1 lb. and 1 lb. per 4000 lbs. charge of mononitroxylene. Sodium fluosilicate by itself may be used as such separation agent, if desired.

The neutralization of the separated and washed mononitroxylene may be carried out by use of any of the inorganic alkalies that form soluble salts with the acids present. Sodium carbonate is very suitable because of its neutralizing power and its lack of harmful effect on the nitrocompound, and sodium bicarbonate may also be used. Under suitable conditions, sodium hydroxide may be preferable because of its greater ability to neutralize certain weak organic acids. We may desire at times also to employ ammonia as a neutralizing agent, either in gaseous form or in aqueous solution.

A desirable step in the preparation of a final product of satisfactory properties is the passage of a dry gas through the neutralized nitroxylene. Preferably air will be blown through for a sufficient time to remove all cloudiness and to give a clear translucent product. This air treatment not only produces a liquid clear in appearance but is advantageous in that the blown product on storage has less tendency to become acidic; hence, such a product gives no corrosion trouble when shipped in tank cars or other metal containers. If ammonia is used as neutralizing agent, air blowing serves to remove all ammonia as well as water present.

Our invention has been described at length in the foregoing. It will be understood, however, that many variations may be made in details of operation, acid compositions, and the like without departure from the scope of the invention: For example, we may at the start of the nitration add to the xylene in the nitrator an acid heel of suitable composition such as residual sulfuric or a mononitroxylene spent acid. It will be understood also that where xylene and nitroxylene have been designated herein such terms are intended to include not only pure compounds but mixtures of isomers of these compounds, and such mixtures will almost invariably be present in commercial operations.

We intend, therefore, to be limited only by the following patent claims.

We claim:

1. A process for preparing mononitroxylene low in dinitroxylene content, which comprises nitrating xylene with a sulfuric acid-nitric acid mixture, agitating the mixture during nitration sufficiently that a state of substantial emulsification exists throughout said mixture such that separation of nitrocompound and acid layers is possible only after more than ten minutes with the untreated emulsion, and separating the nitroxylene from the residual acid.

2. A process for preparing mononitroxylene low in dinitroxylene content, which comprises nitrating xylene with a sulfuric acid-nitric acid mixture containing between 15% and 40% nitric acid, the ratio of nitric acid to xylene being between 0.6 and 0.7 to 1, agitating the mixture during nitration sufficiently vigorously that a state of substantial emulsification exists throughout the mixture such that separation of nitrocompound and acid layers is possible only after more than ten minutes with the untreated emulsion, separating the nitroxylene from the residual acid, and neutralizing the acid nitroxylene portion by means of an alkali.

3. The process of claim 2 in which the acid nitroxylene portion is neutralized by means of sodium carbonate.

4. The process of claim 2 in which the acid nitroxylene portion is neutralized by means of sodium hydroxide.

5. The process of claim 2 in which the acid nitroxylene portion is neutralized by means of ammonia.

6. A process for preparing mononitroxylene low in dinitroxylene content, which comprises nitrating xylene with a sulfuric acid-nitric acid mixture containing between 15% and 40% nitric acid, the ratio of nitric acid to xylene being between 0.6 and 0.7 to 1, agitating the mixture during nitration sufficiently vigorously that a state of substantial emulsification exists throughout the mixture, causing the nitroxylene and the residual acid to separate in layers from one another by gravity, and facilitating said separation by the addition to the liquid mixture, prior to removal of the acid layer, of an inorganic separation adjuvant which comprises a soluble fluoride.

7. A process for preparing mononitroxylene low in dinitroxylene content, which comprises nitrating xylene with a sulfuric acid-nitric acid mixture containing between 15% and 40% nitric acid, the ratio of nitric acid to xylene being between 0.6 and 0.7 to 1, agitating the mixture during nitration sufficiently vigorously that a state of substantial emulsification exists throughout the mixture, causing the nitroxylene and the residual acid to separate in layers from one another by gravity, and facilitating said separation by the addition to the liquid mixture, prior to removal of the acid layer, of an inorganic separation adjuvant which comprises a soluble fluoride and a silicious material.

8. A process for preparing mononitroxylene low in dinitroxylene content, which comprises nitrating xylene with a sulfuric acid-nitric acid mixture containing between 15% and 40% nitric acid, the ratio of nitric acid to xylene being between 0.6 and 0.7 to 1, agitating the mixture during nitration sufficiently vigorously that a state of substantial emulsification exists throughout the mixture, causing the nitroxylene and the residual acid to separate in layers from one another by gravity, and facilitating said separation by the addition to the liquid mixture, prior to removal of the acid layer, of an inorganic separation adjuvant which comprises sodium fluosilicate.

9. A process for preparing mononitroxylene low in dinitroxylene content, which comprises nitrating xylene with a sulfuric acid-nitric acid mixture containing between 18% and 20% nitric acid and having a DVS between 2.60 and 2.95, the ratio of nitric acid to xylene being between 0.6 and 0.7 to 1, agitating the mixture during nitration sufficiently vigorously that substantial emulsification exists throughout the mixture, causing the nitroxylene and the residual acid to separate in layers from one another by gravity and facilitating said separation by addition to the liquid mixture, prior to the removal of the acid layer, of a separation adjuvant comprising a soluble fluoride and a silicious material, neutralizing the separated nitroxylene portion by means of an alkali, and drying said nitroxylene.

GEORGE W. BATCHELDER.
WESLEY M. NAGLE.
JOHN C. VYVERBERG.
JAMES M. WILLIS.